US006805113B2

(12) United States Patent
Stephen et al.

(10) Patent No.: US 6,805,113 B2
(45) Date of Patent: Oct. 19, 2004

(54) SUPPORT FRAME BARBECUE GRILL ASSEMBLY

(75) Inventors: Robert T. Stephen, Barrington, IL (US); Ewald Sieg, Palatine, IL (US); Adrian A. Bruno, Rolling Meadows, IL (US); Daniel S. Choi, Mundelein, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/927,892

(22) Filed: Aug. 10, 2001

(65) Prior Publication Data

US 2003/0029437 A1 Feb. 13, 2003

(51) Int. Cl.[7] .......................... A47J 37/00; F24C 15/08
(52) U.S. Cl. ...................... 126/25 R; 126/98; 126/50; 126/304 R
(58) Field of Search .................. 126/41 R, 25 R, 126/9 R, 9 B, 40, 304 A, 304 R, 305, 50; 99/449; 135/142; 403/247, 248, 249, 260; 285/23, 382.4

(56) References Cited

U.S. PATENT DOCUMENTS

| | | |
|---|---|---|
| 3,688,757 A | 9/1972 | Dusek |
| 4,416,248 A | 11/1983 | Schlosser .................. 126/9 B |
| 4,432,334 A | 2/1984 | Holt .......................... 126/9 B |
| 4,508,095 A | 4/1985 | Bloechel .................... 126/9 R |
| 4,627,410 A | 12/1986 | Jung .......................... 126/25 A |
| 4,677,964 A | 7/1987 | Lohmeyer et al. ......... 126/41 R |
| 4,688,541 A | 8/1987 | Stephen et al. ............ 126/25 R |
| 4,741,322 A | 5/1988 | Lin ............................ 126/25 R |
| 4,809,671 A | 3/1989 | Vallejo, Jr. ................ 126/39 R |
| 4,886,045 A | 12/1989 | Ducate, Jr. et al. ....... 126/41 R |
| 4,895,068 A | 1/1990 | Hanagan et al. .............. 99/357 |
| 4,896,650 A | 1/1990 | Hait ........................... 126/9 R |
| 4,899,725 A | 2/1990 | Barron, Jr. ................ 126/41 R |
| 4,949,701 A | 8/1990 | Krosp et al. .............. 126/41 R |
| 4,955,358 A | 9/1990 | Harris et al. .............. 126/25 R |
| 4,966,125 A | 10/1990 | Stephen et al. ........... 126/25 R |
| 4,984,515 A | 1/1991 | Pivonka ....................... 99/449 |
| 5,027,788 A | 7/1991 | Schlosser et al. ......... 126/25 R |
| 5,050,577 A | 9/1991 | Baynes et al. .............. 126/9 R |
| 5,065,734 A | 11/1991 | Elliott ......................... 126/9 R |
| 5,070,776 A | 12/1991 | Schlosser et al. ............. 99/450 |

(List continued on next page.)

FOREIGN PATENT DOCUMENTS

| | | |
|---|---|---|
| EP | 0 353 642 A1 | 2/1990 |
| WO | WO 00/76381 A1 | 12/2000 |

OTHER PUBLICATIONS

Assembly Manual and component sheet for Char–Broil Grill Model 4637133 (Oct. 23, 2000); 5 pgs.

*Primary Examiner*—Josiah Cocks
(74) *Attorney, Agent, or Firm*—Wallenstein Wagner & Rockey Ltd.

(57) ABSTRACT

The present invention provides a barbecue grill assembly comprising an upper assembly and a lower assembly, the upper assembly adapted to receive a cooking chamber. The grill assembly further comprises at least one projection on one of either the lower assembly or the upper assembly, and at least one receiver on the other of said lower assembly or said upper assembly. The projection and the receiver are cooperatively dimensioned such that the projection is received by the receiver. The projection having a first portion and a second portion wherein the first portion is adapted to be biased into contact with an inner surface of the receiver. The barbecue grill assembly includes a lateral assembly, positioned proximate the upper assembly. The lateral assembly is adapted to receive an auxiliary work surface or a cooking burner. The upper, lower, and lateral assemblies are each formed from a plurality of tubular frame members. The upper, lower, and lateral assemblies can be pre-assembled by welding the frame members.

61 Claims, 10 Drawing Sheets

U.S. PATENT DOCUMENTS

| | | | |
|---|---|---|---|
| 5,072,718 A | 12/1991 | Seal | 126/41 R |
| 5,076,252 A | 12/1991 | Schlosser et al. | 126/25 R |
| 5,076,256 A | 12/1991 | Raymer et al. | 126/41 R |
| 5,076,257 A | 12/1991 | Raymer et al. | 126/41 R |
| 5,080,313 A | 1/1992 | Byrum et al. | 248/343 |
| 5,090,398 A | 2/1992 | Raymer et al. | 126/41 R |
| 5,104,080 A | 4/1992 | Berger | 248/250 |
| 5,109,834 A | 5/1992 | Collins et al. | 126/41 R |
| 5,140,973 A | 8/1992 | Home | 126/41 R |
| 5,203,317 A | 4/1993 | James | 126/41 R |
| 5,220,764 A | 6/1993 | James | 52/473 |
| 5,253,634 A | 10/1993 | LeBeouf | 126/25 A |
| 5,293,859 A | 3/1994 | Lisker | 126/26 |
| 5,313,928 A | 5/1994 | Rodgers et al. | 126/38 |
| 5,341,793 A | 8/1994 | Brown | 126/41 R |
| 5,452,707 A | 9/1995 | Harris et al. | 126/41 R |
| 5,531,464 A | 7/1996 | Maurer et al. | 280/47.35 |
| 5,579,755 A | 12/1996 | Johnston | 126/41 R |
| 5,598,834 A | 2/1997 | Grady | 126/506 |
| 5,623,866 A | 4/1997 | Home | 99/444 |
| 5,632,265 A | 5/1997 | Koziol | 126/30 |
| 5,678,531 A | 10/1997 | Byers et al. | |
| 5,819,720 A | 10/1998 | Schubert | 126/41 R |
| 5,941,229 A * | 8/1999 | Schlosser et al. | 126/41 R |
| 5,944,009 A | 8/1999 | Scheller | 126/30 |
| 5,979,431 A | 11/1999 | Hamilton et al. | 126/41 R |
| 6,131,560 A | 10/2000 | Healy | 126/30 |
| 6,178,877 B1 | 1/2001 | Samuelson | 99/340 |
| 6,182,560 B1 | 2/2001 | Andress | 99/400 |
| 6,257,229 B1 | 7/2001 | Stewart et al. | 126/276 |

\* cited by examiner

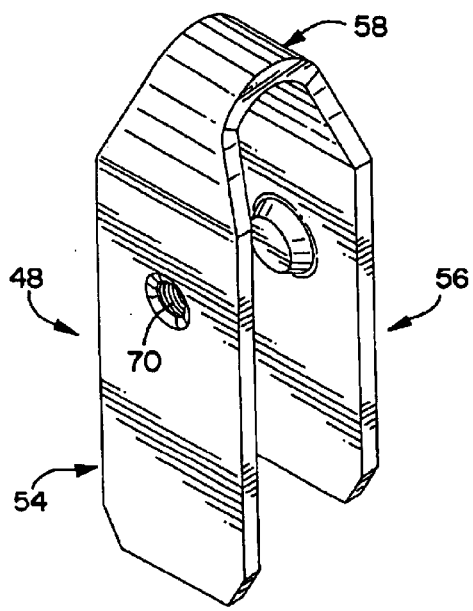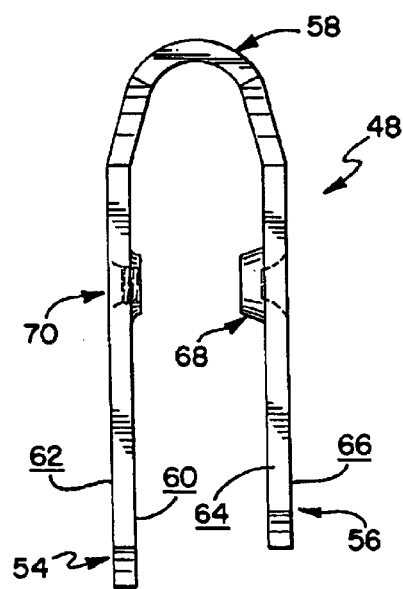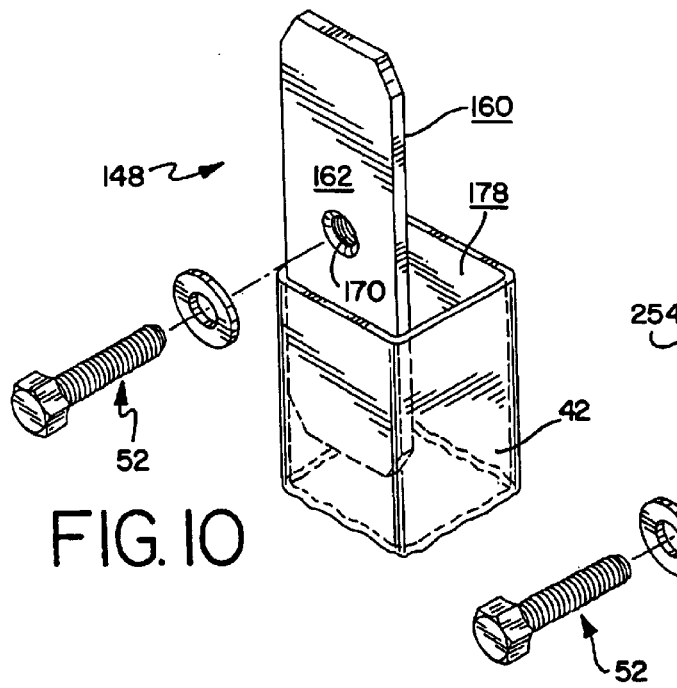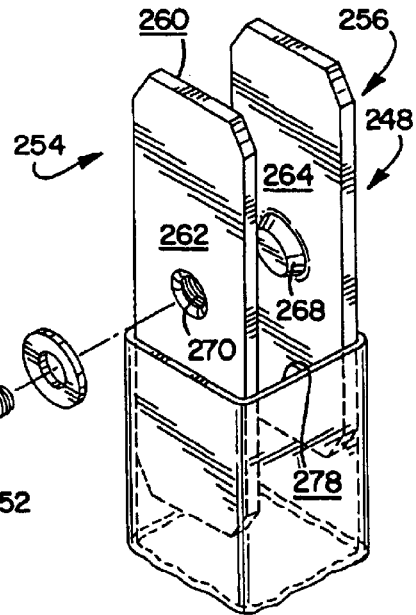

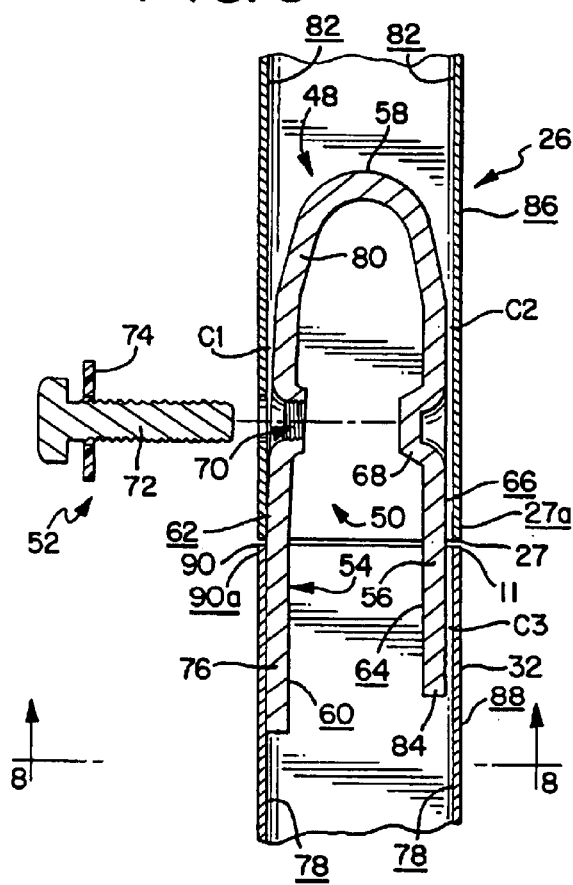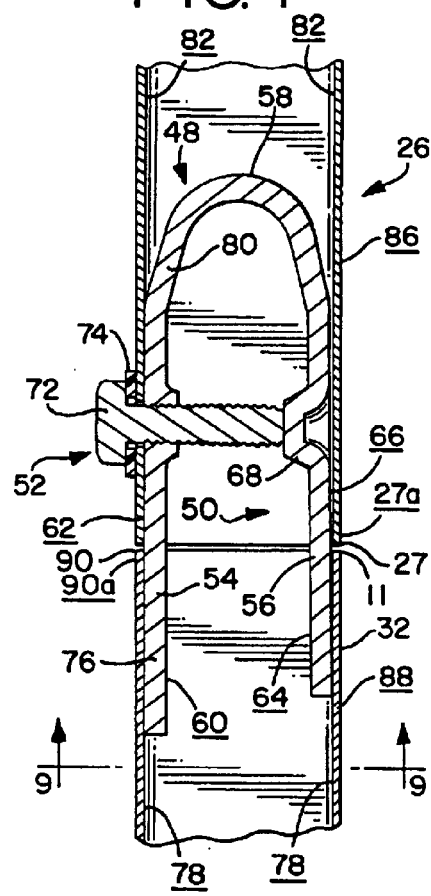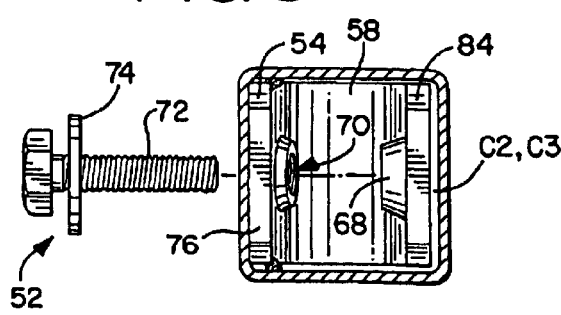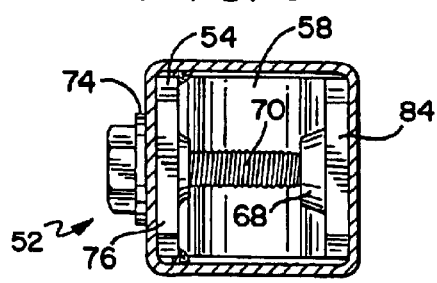

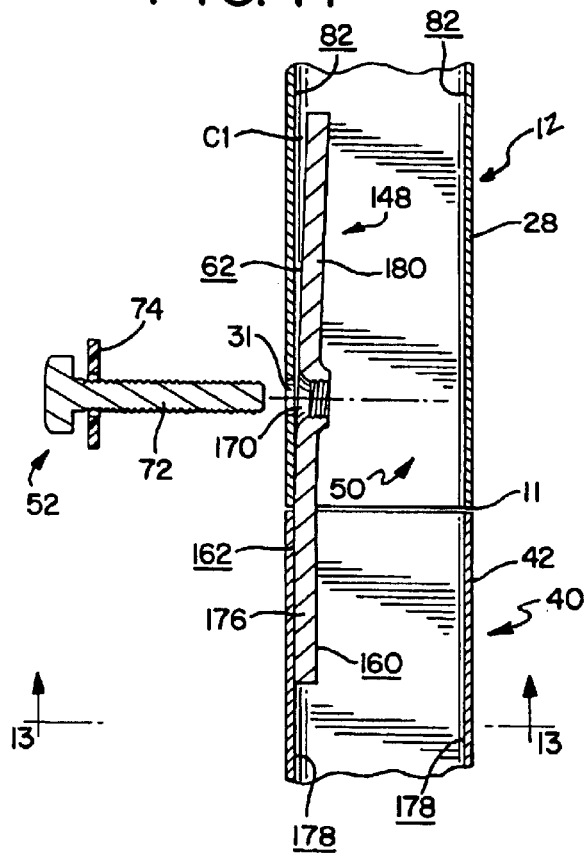
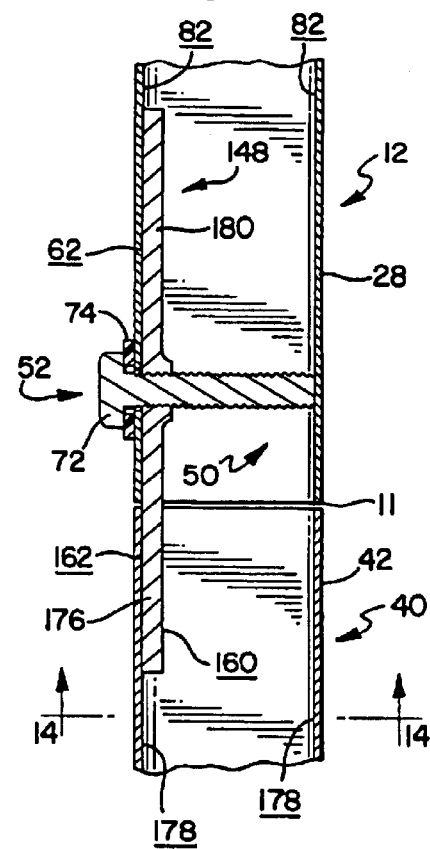
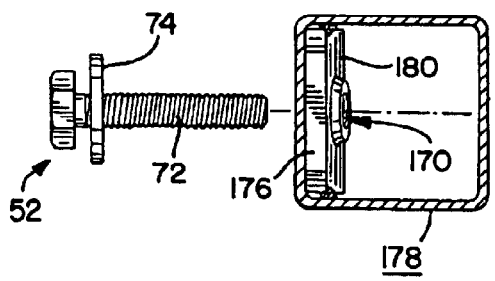
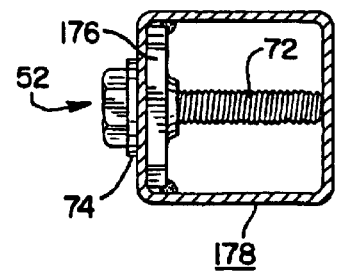

SUPPORT FRAME BARBECUE GRILL ASSEMBLY

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates to a support frame barbecue grill. More specifically, the present invention relates to a barbecue grill support frame assembly having distinct sub-assemblies.

BACKGROUND OF THE INVENTION

Over the past two decades, gas barbecue grills have become increasingly popular as outdoor cooking devices. Gas barbecue grills generally consist of a support structure connected to a cooking chamber. The structure can be configured to provide support for other elements, including a fuel tank and auxiliary cooking surfaces. The support structure is usually formed from a substantial number of frame members connected together with fasteners such as nuts and bolts. Gas barbecue grills are typically packaged with the support structure, the cooking chamber, and any related accessories disassembled to reduce the packaging size.

A concern with gas barbecue grills of this type is the difficulty in assembling the grill. Due to the large number of packaged components, including the frame members, the fasteners, and other related hardware, the purchaser is required to perform a myriad number of steps to connect the frame members and assemble the support structure. The purchaser faces more time-consuming steps when connecting the cooking chamber to the support structure. The assembly becomes even more daunting when the barbecue grill includes auxiliary cooking surfaces, auxiliary cooking burners, and other accessories such as temperature gages and cooking controls. As a general rule, the assembly process becomes more difficult as the complexity of the grill design increases. From a marketing standpoint, a grill design that involves a complex assembly process is unappealing to potential purchasers and as a result, should be avoided.

A second concern with this type of gas barbecue grills is that the support structure is susceptible to a loss of structural integrity due to the multiplicity of fasteners used to hold the frame members together. Also, the fasteners may wear and loosen over time. The reduction in structural integrity can also affect side support structures connected to the support structure and cause a reduction in the load-bearing capacity of the side support structures. As a result, additional and more complex structure may be required.

An example of existing gas barbecue grill designs suffering from the problems identified above is U.S. Pat. No. 5,140,973 to Home. Referring to FIGS. 1 and 4 therein, the grill 1 has a considerable number of individual components that are secured with threaded fasteners that are susceptible to loosen over time. Consequently, the grill assembly experiences a reduction in structural integrity. Also, as shown in FIG. 3, the upper post 31 and lower post 32 are connected with a spring 4 that results in a non-linear, disjointed appearance at the junction of the posts 31, 32.

Another example of existing gas grill design with a complex assembly that is susceptible to a reduction in structural integrity over time is U.S. Pat. No. 4,984,515 to Pivonka. Referring to FIGS. 1 and 3 therein, cart assembly 10 is formed from numerous frame members 16, 76, 78 inserted through sleeves 36, 38, 40, 42, which are attached to end frame members 12, 14. The frame members 16, 76, 78 are secured in place by the interaction of a threaded fastener 52, 54, 56, 58 and nut 44, 46, 48, 50 with the sleeves 36, 38, 40, 42.

Yet another example of a gas grill design suffering from the above-identified problems is U.S. Pat. No. 5,623,866 to Home. Referring to FIGS. 1–3 and 5, the cart assembly 10 comprises a plurality of frame members 3 and two support brackets 1. The frame members 3 are secured to the brackets 1 by spring-loaded ball 112 embedded in a rigid wall fo the bracket 1 and that engages hole 31 in the member 3. Side tables 4 are secured to the brackets 1 by threaded fasteners inserted through apertures located in an upper portion of each bracket 1. Similarly, the cooking chamber 2 is secured to the brackets 1 by threaded fasteners inserted through apertures located in a top portion of each bracket 1.

Therefore, there is a definite need for a barbecue grill assembly having a durable support frame that can be simply and reliably assembled. In addition, there is a need for a barbecue grill assembly that can be compactly packaged in a state that facilitates easy assembly.

SUMMARY OF THE INVENTION

It is an object of the invention to provide a barbecue grill assembly comprising an upper assembly and a lower assembly, the upper assembly adapted to receive a cooking chamber. The grill assembly further comprises at least one projection on one of either the lower assembly or the upper assembly, and at least one receiver on the other assembly.

In accord with the invention, the projection and the receiver are cooperatively dimensioned such that the projection is received by the receiver. The projection having a first portion and a second portion wherein the first portion is adapted to be biased into contact with an inner surface of the receiver.

In additional accord with the invention, the barbecue grill assembly includes a lateral assembly, positioned proximate the upper assembly. The lateral assembly is adapted to receive an auxiliary work surface or a cooking burner.

In further accord with the invention, the upper, lower, and lateral assemblies are each formed from a plurality of tubular frame members. The upper, lower, and lateral assemblies each can be pre-assembled by welding the frame members. These assemblies can include receivers and insertable projections for assembly by the user.

In still further accord with the invention, the barbecue grill assembly includes means for biasing the first portion of the projection into engagement with the inner surface of the receiver to generally secure the upper and lower assemblies.

Other features and advantages of the invention will be apparent from the following specification taken in conjunction with the following drawings.

BRIEF DESCRIPTION OF THE DRAWINGS

FIG. 4 is a perspective view of a projection of the barbecue grill assembly of FIG. 1;

FIG. 5 is a side view of the projection of FIG. 4;

FIG. 6 is a partial cross-section of the projection of the barbecue grill assembly of FIG. 1, showing the projection inserted in a receiver in a unbiased position;

FIG. 7 is a partial cross-section of the projection of FIG. 6, showing the projection inserted in the receiver in a biased position;

FIG. 8 is a cross-section of the projection and the receiver taken along line 8—8 of FIG. 6, showing the projection and the receiver in the unbiased position;

FIG. 9 is a cross-section of the projection and the receiver taken along line 9—9 of FIG. 7, showing the projection and the receiver in the biased position;

FIG. 10 is a perspective view of a second projection embodiment of the barbecue grill assembly of FIG. 1;

FIG. 11 is a partial cross-section of the projection of FIG. 10, showing the projection inserted in the receiver in the unbiased position;

FIG. 12 is a partial cross-section of the projection of FIG. 10, showing the projection inserted in the receiver in the biased position;

FIG. 13 is a cross-section of the projection and the receiver taken along line 13—13 of FIG. 11, showing the projection and the receiver in the unbiased position;

FIG. 14 is a cross-section of the projection and the receiver taken along line 14—14 of FIG. 12, showing the projection and the receiver in the biased position;

FIG. 15 is a perspective view of a third projection embodiment of the barbecue grill assembly of FIG. 1;

DETAILED DESCRIPTION OF THE INVENTION

Figure 1:
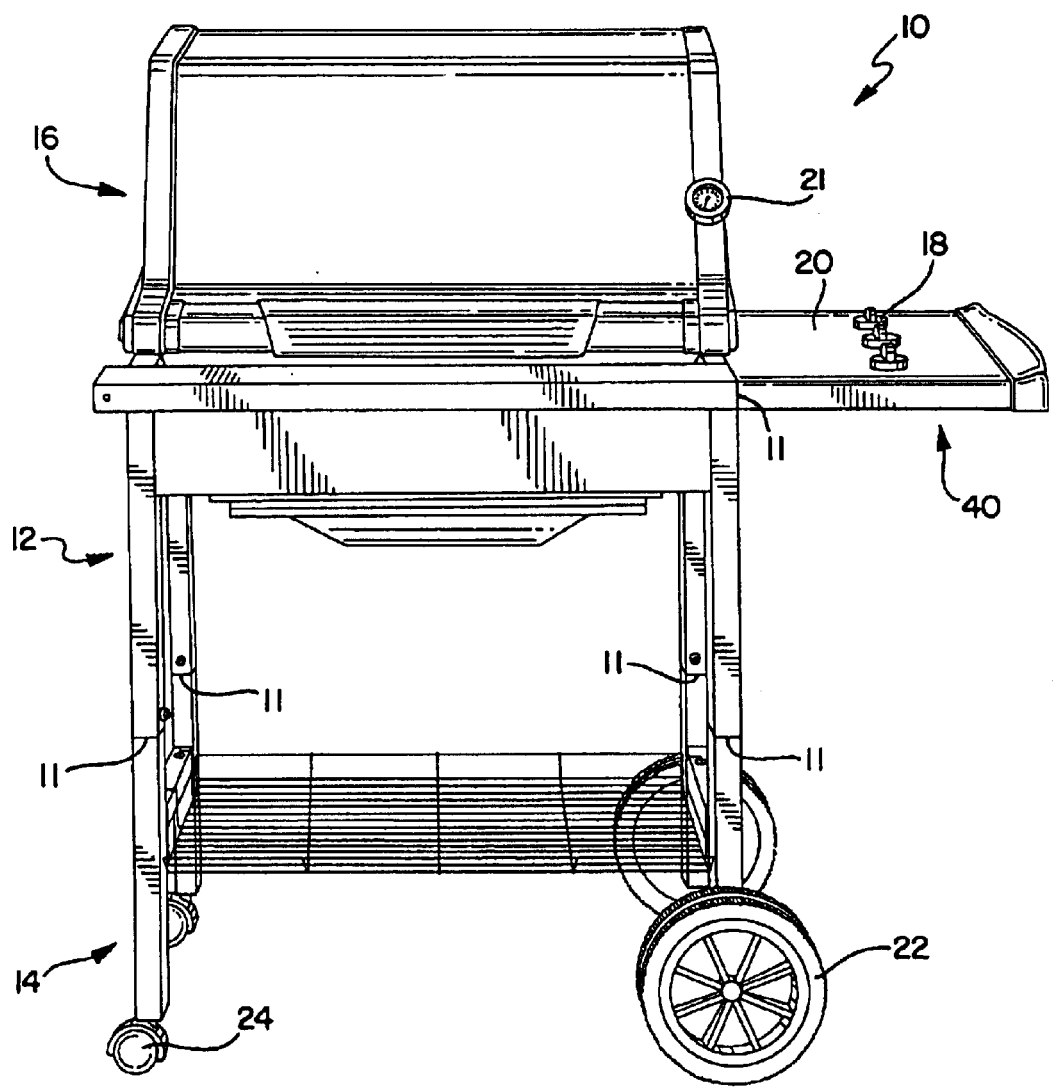
FIG. 1 is a front elevation view of a barbecue grill assembly of the invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A barbecue grill assembly 10 is shown in FIG. 1. The barbecue grill assembly 10 comprises an upper frame assembly 12, a lower assembly 14, and a lateral assembly 40. The upper frame assembly 12 has a configuration sufficient to receive and/or support a cooking chamber or firebox 16. In addition, the barbecue grill assembly 10 can include a controls 18, control panel 20, temperature gauge 21, wheels 22, and casters 24. The grill assembly 10 includes at least one junction 11. In general terms, the junction 11 is a cooperative structure resulting from joined structures of the grill assembly 10.

Figure 2:
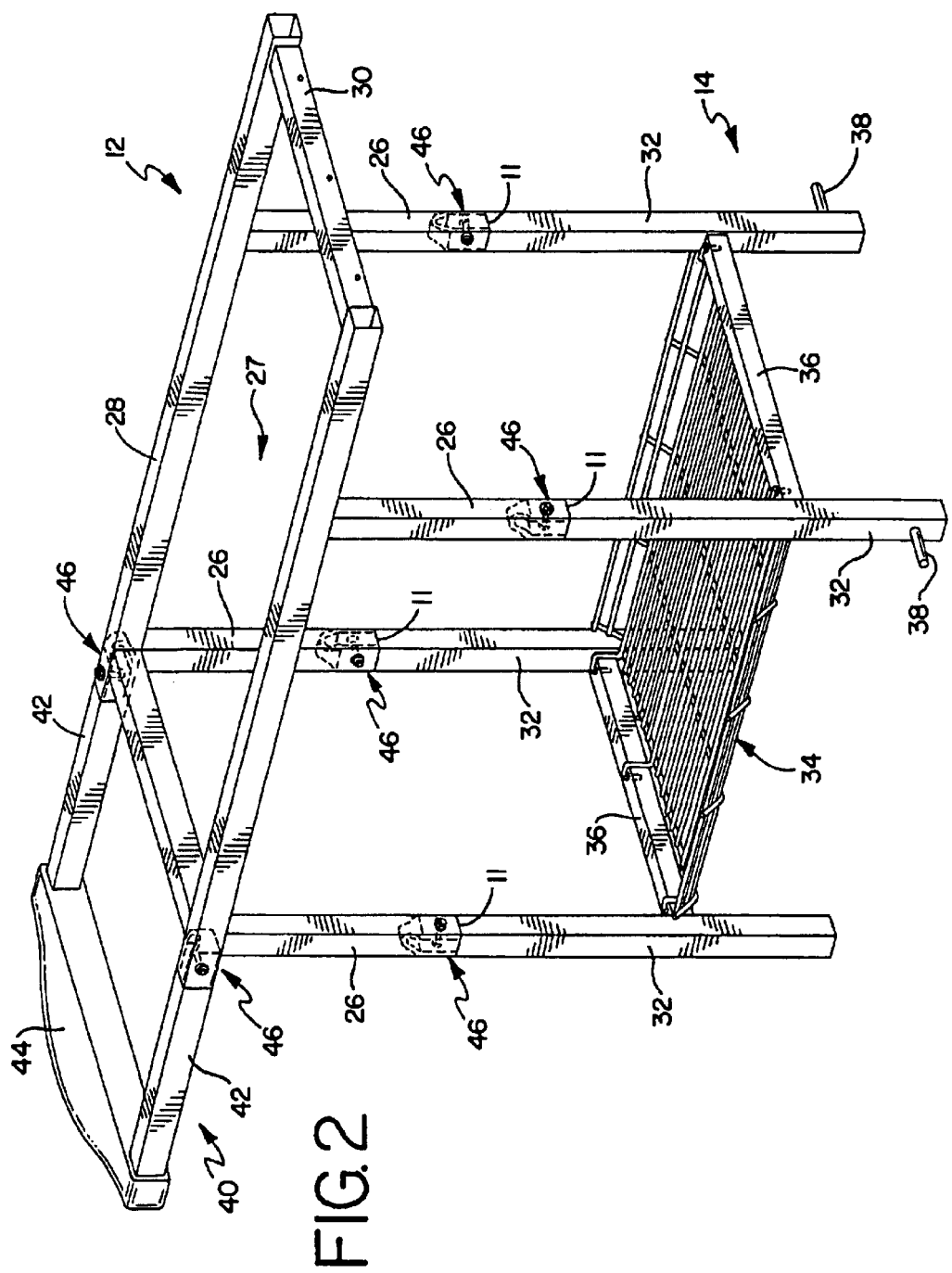
FIG. 2 is a perspective view of the barbecue grill assembly of FIG. 1, showing an upper assembly, a lower assembly, and a lateral assembly.
Figure 3:
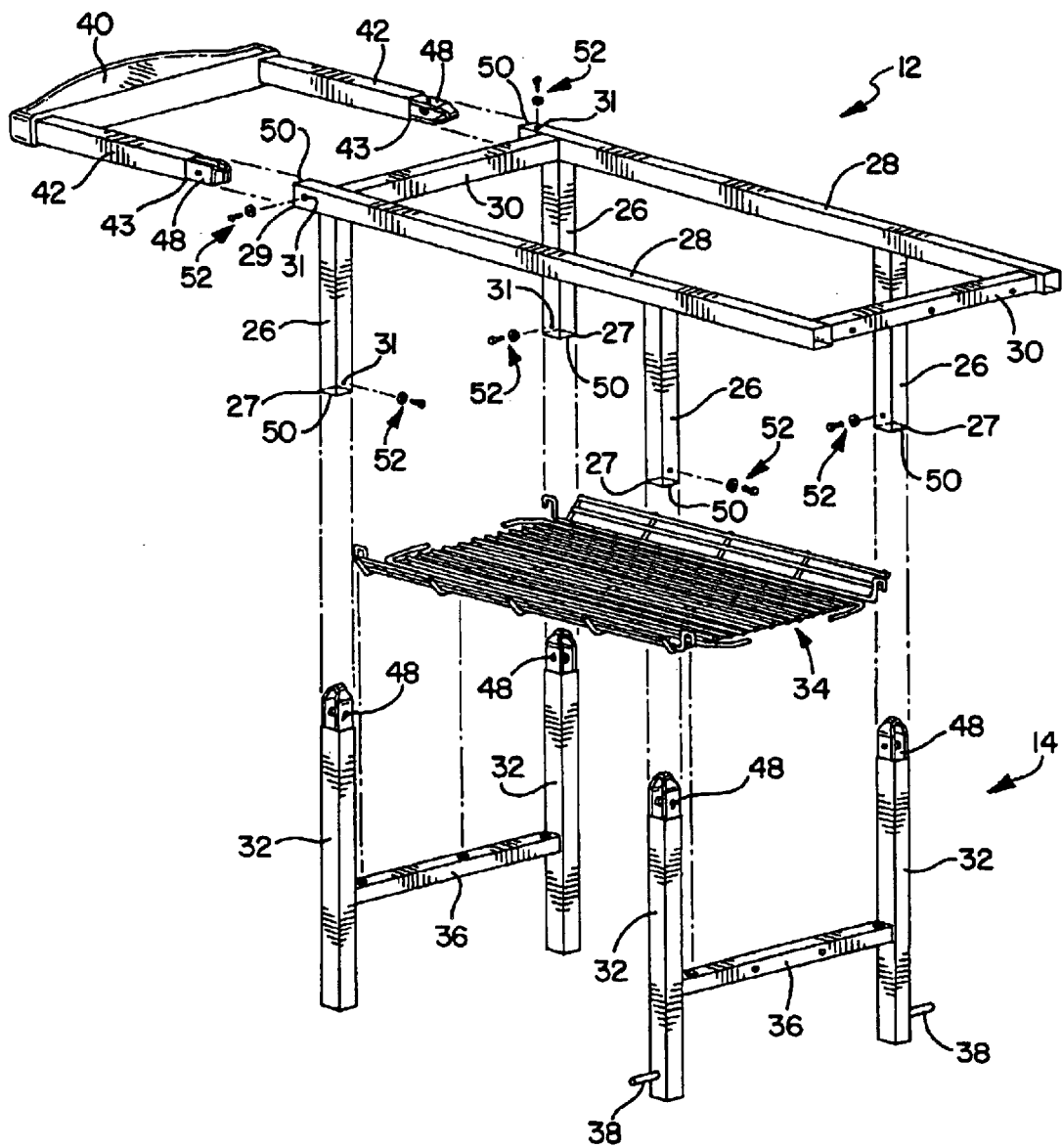
FIG. 3 is an exploded perspective view of the barbecue grill assembly of FIG. 1.

Referring to FIGS. 2 and 3, in a preferred embodiment, the upper frame assembly 12 is formed from at least one frame member, including upper vertical members 26, upper horizontal members 28, and upper cross members 30. The number and size of members 26, 28, 30 comprising the upper assembly 12 can vary according to design parameters, including the size and shape of the cooking chamber 16. The upper frame assembly 12 has an upper interior space 27 defined by the members 26, 28, 30, which is adapted to receive the cooking chamber 16. The upper assembly 12 can include a cross-member (not shown) connecting one side of the vertical members 26. The cross-member is adapted to provide additional support to the side that it is connecting. The cross-member can be configured as a panel or elongated structure to engage and/or support a fuel tank (not shown). In addition, a tank scale (not shown) can be attached to the cross-member wherein the fuel tank is connected to the tank scale and the cross-member.

Alternatively, to reduce the number of components in the upper assembly 12, the horizontal members 28 or the cross members 30 can be omitted from the assembly 12. Accordingly the remaining members would define the interior space 27 adapted to receive the cooking chamber 16. In this configuration, at least one vertical member 26 extends from a portion or a surface of the cooking chamber 16.

To further reduce the number of components in the upper assembly 12, the horizontal members 28 and the cross members 30 are omitted from the assembly 12. Accordingly, the cooking chamber 16 and at least one vertical member 26 defines the upper assembly 12. In this configuration, the vertical member 26 extends from a portion or a surface of the cooking chamber 16.

In a further attempt to reduce the number of components in the upper assembly 12, the cooking chamber 16 is formed or cast with at least one socket or stem. Preferably, the socket depends from a portion or a surface of the cooking chamber 16. The socket can have a wide range of dimensions and configurations. An open end of the socket has an inner dimension and as a result, the socket is adapted to receive a portion of a structural element of the lower assembly 14. In this configuration, the separate vertical member 26 of the upper assembly 12 can be omitted.

Alternatively, the socket is adapted to receive a portion of a union member to secure the upper and lower assemblies 12, 14. As described in detail below, the union member is an elongated structure adapted to be inserted into a portion of the socket and a portion of the lower assembly to join and secure the upper and lower assemblies 12, 14.

In a preferred embodiment, the lower frame assembly 14 is formed from at least one frame member, including lower vertical members 32, a rack, panel, or tray 34, and lower cross members 36. Preferably, the members 32, 36 form two H-shaped sub-assemblies. Each of the sub-assemblies can be pre-assembled by a number of methods, including welding the members 32, 36, or by use of fasteners. The tray 34 is a generally rigid structure that joins the members 32, 36 to form the lower assembly 14. In addition to providing structural support to the lower assembly 14, the tray 34 can provide storage for the accessories used in connection with the grill assembly 10.

Alternatively, the tray 34 can be replaced by at least one horizontal member (not shown) similar to members 32, 28 to provide horizontal support to the lower assembly 14. The horizontal member thereby joins the H-shaped sub-assemblies. Alternatively, the horizontal member and the members 32, 38 are pre-assembled by a number of methods, including welding, or fasteners, to form the lower assembly 14. A wheel lug 38 extends from a lower portion of the lower vertical member 32, and is adapted to receive a wheel 22.

In a preferred embodiment, the grill assembly 10 includes a lateral frame assembly 40, which is positioned generally lateral to the upper frame assembly 12. The lateral frame assembly 40 is formed from at least one frame member, including lateral frame members 42 and a trim piece or an end cap 44. Although the lateral assembly 40 is shown on the one side of the upper assembly 12, the assembly 12 can be positioned on either side of the upper assembly 12. In addition, lateral assemblies 12 could be positioned on both sides of the upper assembly 12. The lateral assembly 40 is adapted to provide extended support for an auxiliary cooking burner, a work surface, or control elements. This means that the lateral assembly 40 supports the cooking burner, the work surface, or the control elements in an extended and a cantilevered position. The dimensions and configuration of the lateral assembly 40 vary with the design parameters of the grill assembly 10.

Although shown positioned only lateral to the upper assembly 12, the lateral assembly 40 can be positioned lateral to the lower assembly 14. In this configuration, the lateral assembly 40 supports a fuel tank or other accessories for use in connection with the grill assembly 10. The number of lateral assemblies 40 employed in the grill assembly 10 varies with the design parameters of the grill assembly 10.

The junction 11 is a cooperative structure between the lower frame member 32 and the upper frame member 26. Described in a different manner, the junction 11 is a position of securement between the upper and lower frame members 26, 32. In addition, the junction 11 is a cooperative structure between the lateral member 42 and the horizontal member 28. Although the junction 11 is shown at a general mid-point between the upper and lower assemblies 12, 14, junction 11 can be located at various points in the grill assembly 10. Consequently, the length of the members in the upper and lower assemblies 12, 14 can vary. Although a total of six separate junctions 11 are shown in FIGS. 2 and 3, a greater or lesser quantity of junctions 11 can be employed to join the upper and lower assemblies 12, 14 and the upper and lateral assemblies 12, 40 depending upon the design parameters, including the configuration of each assembly 12, 14, 40.

An alternate embodiment comprises a frame for an outdoor cooking device (not shown) generally comprising an upper assembly and a lower assembly. Instead of receiving a cooking chamber, the frame is adapted to receive a cooking device, for example an outdoor stove-top burner, or a deep fryer. The cooking device and the frame are adapted such that the device is generally surface-mounted within the frame. This means that an upper surface of the cooking device and an upper surface of the frame are generally in planar alignment. The auxiliary burner is surface-mounted within the frame. The frame is adapted to be mobile such that the frame and the cooking device can be moved between various locations, thereby increasing the versatility of the frame.

Alternatively, the frame for an outdoor cooking device comprises a first assembly positioned proximate a second assembly. In this manner, the second assembly extends substantially lateral to the first assembly. The first and second assemblies are both adapted to receive a cooking device, for example an auxiliary burner such as an outdoor stove-top burner, or a deep fryer. As a result, the frame may provide a plurality of such outdoor cooking devices.

Preferably, the frame assemblies 12, 14, 40 are constructed from tubular members. In addition, the alternate embodiment described above, the frame for an outdoor cooking device, is preferably constructed from tubular members. However, single-sided and two- or three-sided members are within the scope of the invention. Multi-sided members can have a variety of cross-sectional shapes, including but not limited to square, rectangular, U-shaped, or circular.

Preferably, the members 26,28,30 are pre-assembled to form the upper assembly and the members 32, 36 are pre-assembled to form the lower assembly 14. The degree or level of assembly for each of the assemblies 12, 14 can vary. Accordingly, either of the upper or lower assemblies 12, 14 can be partially pre-assembled. Similarly, the lateral assembly 40 can be partially pre-assembled.

Welding is the preferred method to pre-assemble the members 26,28,30,32,36 due to the high strength and durability it provides. However, the members can be pre-assembled with a number of different methods, including but not limited to fasteners, such as rivets, pins, or threaded fasteners. As discussed in detail below, pre-assembling the assemblies 12, 14 significantly reduces the time required to assemble the grill assembly 10.

The upper and lower assemblies 12, 14 are joined by mechanical engagement of an engagement assembly 46. Similarly, the upper and lateral assemblies 12, 40 are joined by engagement assembly 46. The engagement assembly 46 is positioned proximate the junction 11. Although a total of six separate engagement assemblies 46 are shown in FIGS. 2 and 3, a greater or lesser quantity of assemblies 46 can be employed to join the upper and lower assemblies 12, 14 and the upper and lateral assemblies 12, 40 depending upon the design parameters, including the configuration of each assembly 12, 14, 40.

Referring to FIGS. 3-5, the engagement assembly 46 comprises a projection 48 and a receiver 50. As described more fully below, an open end of a member has an inner dimension that generally defines the receiver 50. The receiver 50 is adapted to receive a portion of the projection 48. When the receiver 50 receives an extent of the length of the projection 48, the receiver 50 and the projection 48 are in a mating arrangement.

The projection 48 can be positioned on the upper assembly 12, the lower assembly 14, or the lateral assembly 40. The receiver 50 can be positioned on the upper assembly 12, the lower assembly 14, or the lateral assembly 40. These attributes increase the flexibility and utility of the grill assembly 10. The projection 48 and the receiver 50 are generally positioned or located on opposing assemblies 12, 14, 40. For example, when the projection 48 is on one of the upper assembly 12 or the lower assembly 14, the mating receiver 50 is on the other of the upper assembly 12 or the lower assembly 14.

Alternatively, the projection 48 can be positioned on a lower portion of the cooking chamber 16 or depend from a lower portion of the cooking chamber 16. Also, the receiver 50 can be positioned on a lower portion of the cooking chamber 16 or depend from a lower portion of the cooking chamber 16. In this set of configurations, the cooking chamber 16 can be at least partially formed from cast material and the projection 48 and the receiver 50 can be formed from the same cast material. Such an arrangement of extending cast material, such as steel or aluminum, to form a projection 48 or a receiver 50 may also be used for the lateral assembly 40.

As shown in FIG. 3, the open end 27 of the upper vertical member 26 has an interior dimension that generally defines the receiver 50 for the upper assembly 12. Similarly, the open end 29 of the upper horizontal members 28 has an interior dimension that generally defines the receiver 50 for the lateral assembly 40. However, an open end (not shown) of the lower frame member 32 can define the receiver 50, and an open end (not shown) of the lateral frame member 42 can define the receiver 50. Projections 48 are shown on both a lower vertical member 32 of the lower assembly 14 and a lateral frame member 42 of the lateral assembly 40. However, the projection 48 can be positioned in the open end 27 of the upper vertical member 26 or in the open end 29 of the upper horizontal member 28.

Although the receiver 50 is shown as having a square cross-section, the configuration of the receiver 50 may vary depending upon the configuration of the members 26, 28, 32, 42. For example, the receiver 50 will have a round cross-section when suitable cylindrical members 26, 28, 32, 42 are used in the assemblies 12, 14, 40. When two-sided members 26, 28, 32, 42 are used in the assemblies 12, 14, 40, the receiver 50 will have an L-shaped cross-section.

The engagement assembly 46 can further include means 52 for biasing the projection 48 in the receiver 50. An aperture 31, preferably threaded, is positioned near each receiver 50 and is adapted to receive a portion of the biasing means 52. As shown in FIGS. 4 and 5, the projection 48 has a first portion or leg 54, a second portion or leg 56, and an intermediate portion 58. The length of the first portion 54 can exceed the length of the second portion 56. The intermediate portion 58 is adapted to permit biasing or flexing of the first portion 54 and/or the second portion 56. To facilitate assembly of the upper and lower assemblies 12, 14, the intermediate portion 58 can have a reduced thickness or a tapered configuration. The tapered configuration of the intermediate portion 58 functions as a guide during assembly of the upper and lower assemblies 12, 14. In addition, the tapered configuration of the intermediate portion 58 facilitates biasing. The degree or amount of biasing varies with the design parameters of the grill assembly 10, including the design of the projection 48. The biasing means 52 can include a threaded fastener 72 and a washer 74. Alternatively, the fastener 72 can be replaced by a pin.

Referring to FIG. 5, the first portion 54 has an inner surface 60 and an outer surface 62. The second portion 56 has an inner surface 64 and an outer surface 66. A boss 68 is positioned on the inner surface 64 and is adapted to receive a portion of the biasing means 52. The boss 68 can be formed by applying a punching force to the outer surface 66 or by adding an amount of material to the inner surface 64. The second portion 56 has a free end 84. In either the unbiased or biased positions, the free end 84 is unsecured and adapted for biasing.

An aperture 70, preferably threaded, is positioned in the first portion 54. The aperture 70 is adapted to receive a portion of the biasing means 52. The aperture 70 and the boss 68 are cooperatively aligned such that a first end of the biasing means 52 engages the boss 68 when the biasing means 52 extends through the aperture 70.

As shown in FIGS. 2 and 3, two projections 48 in the lower assembly 14 are oriented in a different direction than the remaining projections 48 in the assembly 14. This means that the orientation of the projections 48 in the front portion of the lower assembly 14 differs from those in the rear portion of the assembly 14. Similarly, the projections 48 in the lateral assembly 40 are oriented in a different direction. Varying the orientation of the projections 48 ensures that the grill assembly 10 will be properly assembled. For example, when the upper assembly 12 is properly positioned, the aperture 31 in the upper member 26 will align with the mating aperture 70 in the projection 48. In contrast, when the upper assembly 12 is improperly positioned, the aperture 31 in the upper member 26 will not align with the aperture 70 in the projection 48, thereby preventing the biasing means 52 from securing the assemblies 12, 14. In this manner, the projection 48 and the receiver 50 are cooperatively aligned. Consequently, as the orientation of the projections 48 is altered, the orientation of the apertures 31 is similarly altered. The precise orientation of the projections 48 can vary depending upon the design parameters, including the configuration of the projections 48.

The projection 48 can be formed from plastic, steel, aluminum, or other metals, including metal alloys. Forming the projection 48 from metal is preferred because of its high strength and deformability. Depending upon the material used to form the projection 48, the degree and amount of elastic deformation of the projection 48 will vary.

A portion of the upper and lower assemblies 12, 14 are shown joined in FIGS. 6 and 7. The projection 48 and the receiver 50 are cooperatively dimensioned such that a portion of the projection 48 is received by the receiver 50. Because the projection 48 and the receiver 50 are cooperatively dimensioned, the projection 48 is removably insertable in the receiver 50. In this manner, a projection 48 mates with a corresponding receiver 50. Described in a different manner, the receiver 50 removably receives a portion of the projection 48. As a result, the projection 48 can be repeatedly inserted into and received by the receiver 50. In a preferred embodiment, the projection 48 can be repeatedly inserted into and received by the receiver 50 without damaging the receiver 50 or altering the configuration of the receiver 50.

The projection 48 is shown on a lower vertical member 32 of the lower assembly 14 and the receiver 50 is shown on an upper vertical member 26 of the upper assembly 12. However, the projection 48 can be positioned on the vertical member 26 of the upper assembly 12 and the receiver 50 can be positioned on the vertical member 32 of the lower assembly 14.

The size and configuration of the engagement assembly 46, including the projection 48 and the receiver 50, can be varied according to the configuration of the members comprising the assemblies 12, 14, and 40.

As shown in FIGS. 6 and 7, a lower portion 76 of the first portion 54 of the projection 48 is attached to an inner surface 78 of the receiver 50 of the frame member 32. Preferably, the lower portion 76 is fixedly attached to the inner surface 78. Referring to FIGS. 6 and 8, before the biasing means 52 is inserted, a first cavity or clearance C1 exists between an upper portion 80 of the first portion and an inner surface 82 of the receiver 50. A second cavity or clearance C2 exists between the inner surface 82 and the second portion 56. A third cavity or clearance C3 exists between the inner surface 78 and the second portion 56. At this stage, the projection 48 is at an "unbiased position." In FIGS. 7 and 9, the biasing means 52 is inserted through the apertures 31, 70 and into engagement with the boss 68 of the second portion 56. At this stage, the projection 48 is at a "biased position." In the biased position, a portion of the first portion 54 is biased into contact with the inner surface 82. Specifically, the upper portion 80 of the first portion 54 is biased into contact with the inner surface 82 such that the clearance C1 is generally eliminated. This occurs when the threads of the fastening means 52 engage the threads of the apertures 31, 70. Also, in the biased position, a portion of the second portion 56 is biased or deformed into contact with the inner surfaces 78, 82. Specifically, the second portion 56 is biased into contact with the surface 78 of the frame member 32 and the inner surface 82 of the receiver 50 such that the clearances C2, C3 are generally eliminated. This occurs when the biasing means 52 engages the boss 68 and exerts a sufficient force on the boss 68 causing the second portion 56 to bias or deform in the direction of the inner surfaces 78, 82. The biasing or deformation is elastic, meaning that once the applied load is released, the projection 48 returns to its original shape as reflected in the unbiased position.

The location of the boss 68 and the aperture 70 can affect the degree or amount of biasing with respect to the inner surfaces 78, 82. Referring to FIGS. 6 and 7, the boss 68 and aperture 70 are positioned a generally short distance from the intermediate portion 58 and within the upper frame member 26. In this position, the second portion 56 can be biased against both the inner surface 78 and the inner surface 82 such that the clearances C2, C3 are eliminated. In contrast, the boss 68 and the aperture 70 can be positioned a generally greater distance from the intermediate portion 58 and within the lower frame member 32. In this position, the second portion 56 can be biased against only the inner surface 78 such that only the clearance C3 is eliminated.

In the unbiased position, the upper frame member 26 and the lower frame member 32 are joined but transverse movement between the frame members 26, 32 is not precluded due to the clearances C1, C2, C3. In addition, the frame members 26,32 are not adequately secured to prevent longitudinal movement. As a result, the upper assembly 12 and the lower assembly 14 can be separated. In the biased position, the frame member 26, 32 are adequately secured to generally prevent both longitudinal and transverse movement between the assemblies 12, 14. Consequently, the grill assembly 10 has sufficient structural integrity to support the cooking chamber 16. In a partially biased position (not shown) where the biasing means 52 has been inserted through the apertures 31, 70 but has not engaged the boss 68, longitudinal movement between the assemblies 12, 14 is prevented and transverse movement is prevented to a lesser extent.

Described in a different manner, the upper vertical member 26 has an outer wall surface 86 and the lower vertical member 32 has an outer wall surface 88. As shown in FIG. 6, when the projection 48 is received by the receiver 50, the outer wall surface 86 of the upper frame member 26 is in planar alignment with the outer wall surface 88 of the lower frame member 32. This means that the outer surfaces 86, 88 are in close cooperation, meaning that they are generally flush and not offset.

Referring to FIG. 7, when the biasing means 52 is sufficiently inserted into the aperture 70 to bias the first portion 54 into contact with the inner surface 82, the outer surfaces 86, 88 remain in planar alignment. When the biasing means 52 is further inserted into the aperture 70 to bias the second portion 56 into contact with the inner surfaces 78, 82, the outer surfaces 86, 88 remain in planar alignment. In contrast to existing grill designs, when the surfaces 86, 88 are in planar alignment, the vertical members 26, 32 have a "smooth" appearance causing the grill assembly 10 to have a linear appearance at the junction 11 between the upper and lower assemblies 12, 14.

Described in yet another manner and referring to FIGS. 6 and 7, the upper vertical member 26 has an open, outer end 27 with an end surface 27a with geometric dimensions. The outer dimensions are generally represented by the perimeter of the end 27. The lower vertical member 32 has an open, outer end 90 with an end surface 90a with geometric dimensions. The outer dimensions are generally represented by the perimeter of the end 90, which is generally alignable with the geometric dimensions of the upper member 27. Preferably, the outer dimensions of the end 27 are equal to the outer dimensions of the end 90.

When the projection 48 is received by the receiver 50, the vertical members 26, 32 are secured in an end-to-end configuration wherein the end 27 is proximate the end 90 and the end surface 27a is proximate the end surface 90a. In the end-to-end configuration, the outer dimension of the upper vertical member 26 is substantially aligned with the outer dimension of the lower vertical member 32. As a result, there is no overlap or overhang between the outer dimensions of the members 26, 32 or between the ends 27, 90. When there is either an overlap or an overhang, the junction 11 between the members 26, 32 appears disjointed and the aesthetic appearance of the barbecue grill assembly 10 is reduced.

Referring to FIG. 7, when the biasing means 52 is sufficiently inserted into the aperture 70 to bias the first portion 54 into contact with the inner surface 82, the vertical members 26, 32 remain secured in an end-to-end configuration and the outer dimensions remain in substantial alignment. When the biasing means 52 is further inserted into the aperture 70 to bias the second portion 56 into contact with the inner surfaces 78, 82, the vertical members 26, 32 remain secured in an end-to-end configuration and the outer dimensions remain in substantial alignment. Unlike existing grill designs, when the vertical members 23, 32 are in an and-to-end configuration the grill assembly 10 has a linear appearance at the junction 11 between the upper and lower assemblies 12, 14.

As previously discussed, the projection 48 and the receiver 50 can be used to join the lateral and upper assemblies 12, 40. Accordingly, the projection 48 can be attached to an inner surface (not shown) of either the lateral member 42 of the lateral assembly 40 or the horizontal member 28 of the upper assembly 12. The receiver 50 can be positioned on the other of the lateral member 42 or the horizontal member 28. As discussed above, when the projection 48 is received by the receiver 50 clearances C1, C2, C3 exist at the unbiased position. When the biasing means 52 is introduced, a portion of the first and second portions 54, 56 is biased into contact with inner surface 82 of the receiver 50 and an inner surface (not shown) of the horizontal member 42. At this point, the clearances C1, C2, C3 are generally eliminated and the projection 48 is at the biased position. In the biased position, the members 28, 42 are adequately secured to prevent both longitudinal and transverse movement between the assemblies, 12, 40. Consequently, the lateral assembly 40 is supported in a cantilevered position and the grill assembly 10 has sufficient structural integrity to support a work surface or an auxiliary cooking device in a cantilevered position.

Described in a different manner, when the projection 48 is received by the receiver 50 an outer wall surface (not shown) of the lateral frame member 42 and an outer wall surface (not shown) of the upper horizontal member 28 are in planar alignment. When the biasing means 52 is sufficiently inserted into the apertures 31, 70 to bias the first portion 54 into contact with the inner surface 82 of the receiver 50, the outer wall surface of the lateral member 42 and the outer wall surface of the upper member 28 remain in planar alignment. When the biasing means 52 is further inserted into the apertures 31, 70 to bias the second portion 56 into contact with the inner surface 82 and an inner surface of the lateral member 42, the outer wall surface of the lateral member 42 and the outer wall surface of the upper member 28 remain in planar alignment. Accordingly, the grill assembly 10 has increased structural integrity and a linear appearance at the junction 11 of the upper and lateral assemblies 12, 40.

Described in yet another manner, when the projection 48 is received by the receiver 50, the lateral frame member 42 and the horizontal member 28 are secured in an end-to-end configuration wherein an end 29 of the member 28 is proximate an end 43 of the member 42. In this end-to-end configuration, the outer dimension, meaning the perimeter, of the member 28 is substantially aligned with the outer dimension, meaning the perimeter, of the member 32. When the biasing means 52 is sufficiently inserted into the apertures 31, 70 to bias the first portion 54 into contact with the inner surface 82, the members 28, 42 remain secured in an end-to-end configuration and the outer dimensions remain in substantial alignment. When the biasing means 52 is further inserted into the apertures 31, 70 to bias the second portion 56 into contact with the inner surface 82 and an inner surface of the lateral member 42, the members 28, 42 remain secured in an end-to-end configuration and the outer dimensions remain in substantial alignment. When the members 28, 42 are in an and-to-end configuration the grill assembly 10 has a linear appearance at the junction 11 of the upper and lateral assemblies 12, 40.

An alternate embodiment of the projection 48 is shown in FIGS. 10–14 positioned on lateral frame member 42. The projection 148 has a single-blade configuration. The projection 148 has an inner surface 160 and an outer surface 162. An aperture 170, preferably threaded, is positioned in an upper portion 180 of the projection 148. The aperture 170 is adapted to receive a portion of the biasing means 52.

Referring to FIGS. 11–14, the upper and lateral assemblies 12, 40 are shown joined. The projection 148 and the receiver 50 are cooperatively dimensioned such that a portion of the projection 148 is received by the receiver 50. A lower portion 176 is attached to an inner surface 178 of the lateral member 42 of the lateral assembly 40. As shown in FIGS. 11 and 13, before the biasing means 52 is inserted, a first clearance C1 exists between an upper portion 180 and the inner surface 82 of the receiver 50. At this stage, the projection 148 is at an "unbiased position." In FIGS. 12 and 14, the biasing means 52 is inserted through the apertures 31, 170 and into engagement with the inner surface 82. At this stage, the projection 148 is at a "biased position." In the biased position, the upper portion 180 is biased into contact with the inner surface 82 such that the clearance C1 is generally eliminated. This occurs when the threads of the fastening means 52 engage the threads of the apertures 31, 170. The biasing or deformation is elastic, meaning that once the applied load is released, the projection 148 returns to its original shape as reflected in the unbiased position.

Yet another embodiment of the projection 48 is shown in FIG. 15. The projection 248 has a double-blade configuration with a first portion 254 and a second portion 256 spaced a distance apart. The first portion 254 has an inner surface 260 and an outer surface 262, a portion of which is attached to an inner surface 278 of the lateral member 42 of the lateral assembly 40. The second portion 256 has an inner surface 264 and outer surface 266, a portion of which is attached to inner surface 278. An aperture 270, preferably threaded, is positioned in the first portion 254. A boss 268 is positioned on the inner surface 264 and is adapted to receive the biasing means 52. The projection 248 and the receiver 50 are cooperatively dimensioned such that a portion of the projection 248 is received by the receiver 50.

Figure 16:
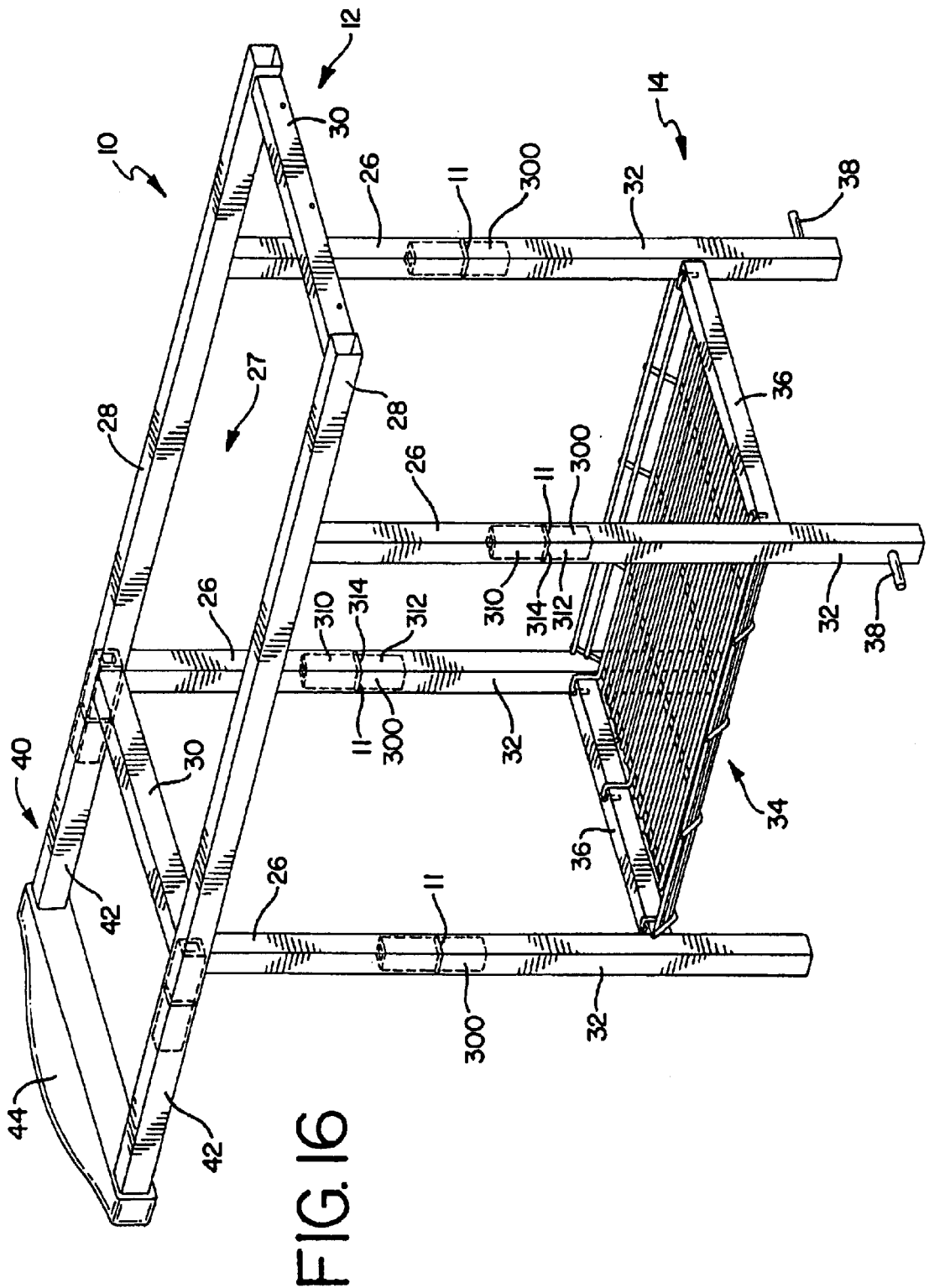
FIG. 16 is a perspective view of a second embodiment of a barbecue grill assembly of the invention.
Figure 17:
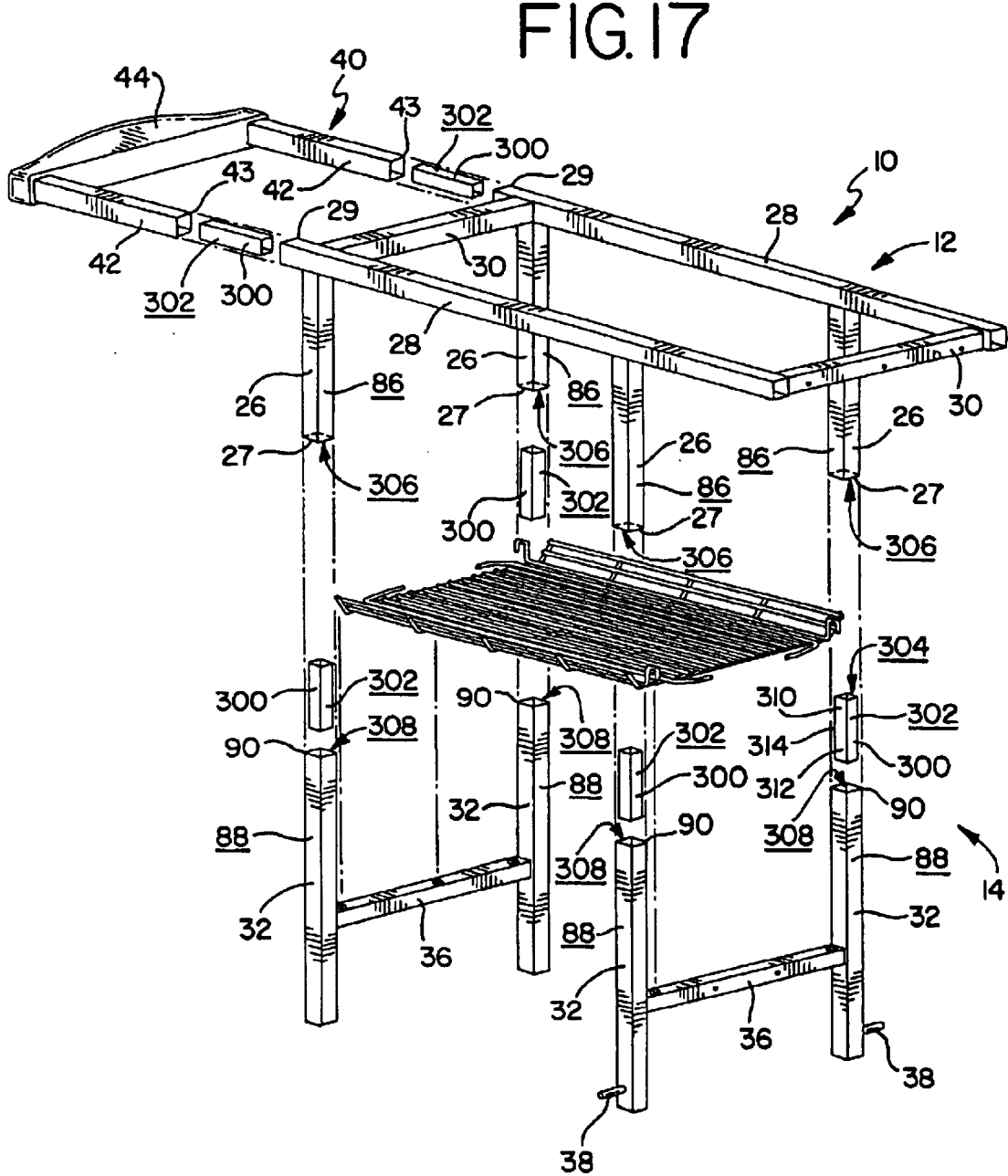
FIG. 17 is an exploded perspective view of the barbecue grill assembly of FIG. 18.

In another preferred embodiment and as shown in FIGS. 16 and 17, the grill assembly 10 includes at least one junction 11. In general terms, the junction 11 is a cooperative structure resulting from joined structures of the grill assembly 10. Specifically, the junction 11 is a cooperative structure between the lower frame member 32 and the upper frame member 26. In addition, the junction 11 is a cooperative structure between the lateral member 42 and the horizontal member 28.

The grill assembly 10 includes a union member 300, which is a separate structure adapted to join the upper assembly 12 and the lower assembly 14 at the junction 11. In addition, the union 300 is adapted to join the upper assembly 12 and the lateral assembly 40 at the junction 11.

Figure 18:
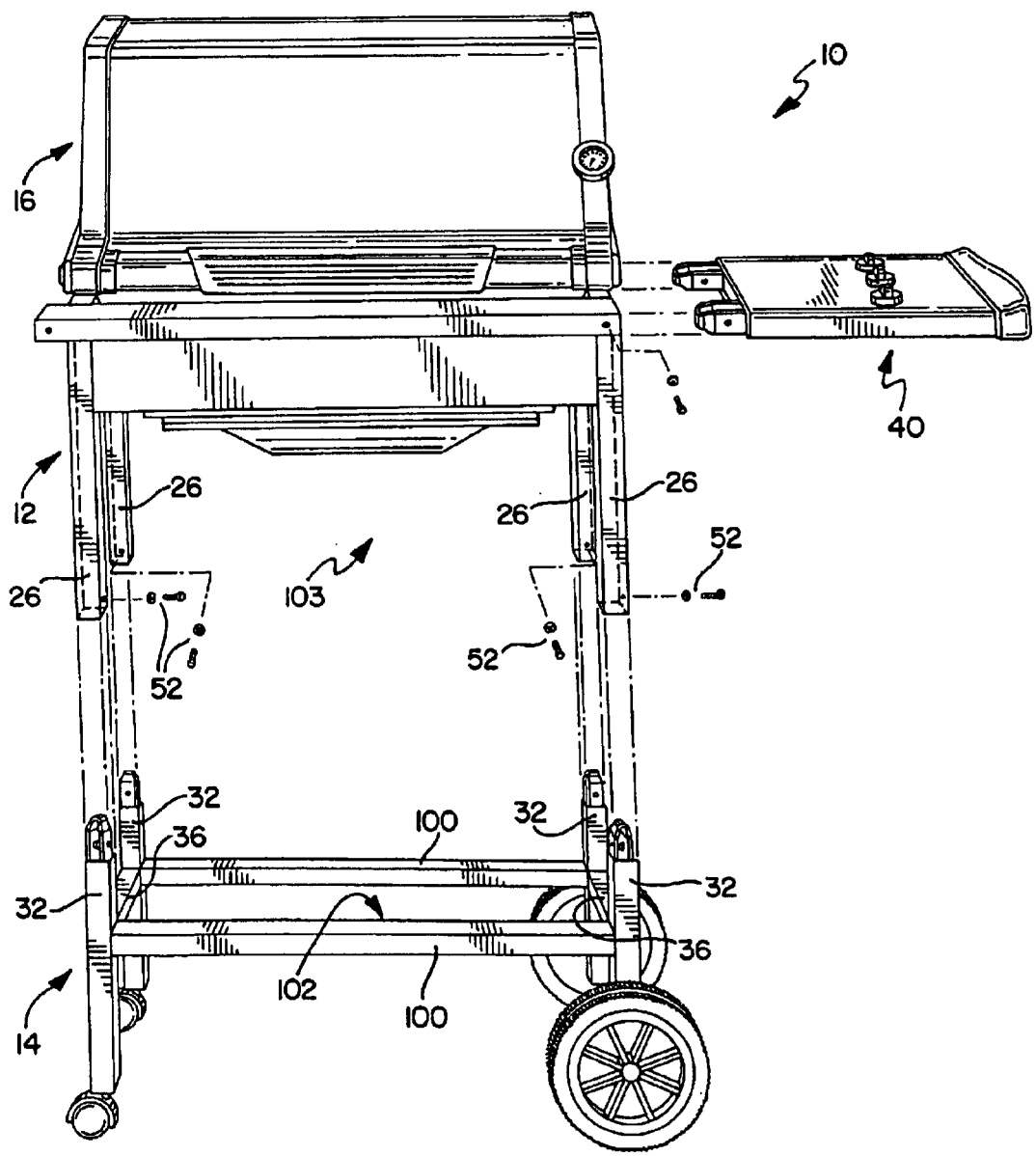
FIG. 18 is an exploded elevation view of the barbecue grill assembly of FIG. 1; and, FIG. 19 is an elevation view of the barbecue grill assembly of FIG. 1, showing the grill assembly in a stacked position.
Figure 19:
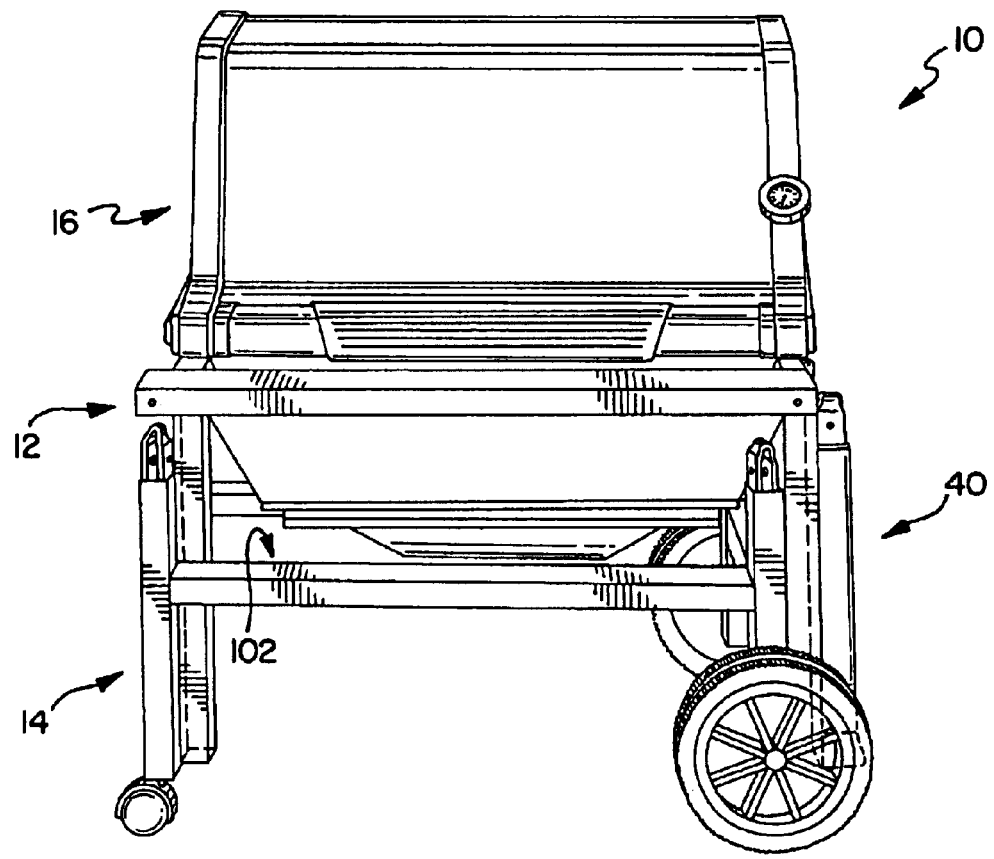

Although the junction 11 is shown at a general mid-point between the upper and lower assemblies 12, 14, junction 11 can be located at various points in the grill assembly 10. Consequently, the length of the members in the upper and lower assemblies 12, 14 can vary. Although a total of six separate junctions 11 and union members 300 are shown in FIGS. 18 and 19, a greater or lesser quantity of junctions 11 and union members 300 can be employed to join the upper and lower assemblies 12, 14 and the upper and lateral assemblies 12, 40 depending upon the design parameters, including the configuration of each assembly 12, 14, 40.

The union member 300 has an outer surface 302 and an inner surface 304. The union member 300 has a length L and a width W, generally defining a perimeter P. The length L and the perimeter P of the union member 300 can vary with the design parameters of the grill assembly. However, the union member 300 has a minimum length L and a minimum perimeter P such that the outer surface 302 of the union member 300 is in frictional engagement with a portion of the inner surface 306 of the vertical member 26 and a portion of an inner surface 308 of the vertical member 32.

To join the upper assembly 12 and the lower assembly 14, the union member 300 is positioned at the junction 11 within the vertical member 26 of the upper assembly 12 and/or the vertical member 32 of the lower assembly 14. Accordingly, the union 300 is cooperatively dimensioned with the vertical members 26, 32. When the union 300 is positioned within the vertical members 26, 32, an outer surface 302 of the union member 300 is in frictional engagement with a portion of an inner surface 306 of the vertical member 26 and a portion of an inner surface 308 of the vertical member 32. The frictional engagement between the vertical members 26, 32 prevents the separation of the upper and lower assemblies 12, 14. The degree or level of frictional engagement varies with the configuration and dimensions of the union 300 and the members 26, 32.

As shown in FIG. 16, when the union member 300 is positioned within the vertical members 26, 32, a first portion 310 of the union member 300 extends past the end 27 of the vertical member 26. Similarly, a second portion 312 of the union member 300 extends past the end 90 of the vertical member 32. An intermediate portion 314 of the union member 300 is positioned proximate the junction 11.

When the union member 300 is positioned within the vertical members 26, 32, the outer wall surface 86 of the upper vertical member 26 is in planar alignment with the outer wall surface 88 of the lower vertical member 32. Consequently, the grill assembly 10 has a linear appearance at the junction 11 of the upper and lower assemblies 12, 14. Furthermore, when the union member 300 is positioned within the vertical members 26, 32, the end 27 of the upper vertical member 26 and the end 90 of the lower vertical member 32 are in an end-to-end configuration.

To join the upper assembly 12 and the lateral assembly 40, the union member 300 is positioned at the junction 11 within the horizontal member 28 of the upper assembly 12 and the lateral member 42 of the lateral assembly 40. Accordingly, the union 300 is cooperatively dimensioned with the vertical members 28, 42. When the union 300 is positioned within the vertical members 28, 42, an outer surface 302 of the union member 300 is in frictional engagement with a portion of an inner surface of the horizontal member 28 and a portion of an inner surface of the lateral member 42.

When the union member 300 is positioned within the horizontal member 28 and the lateral member 42, the an outer wall surface (not shown) of the horizontal member 28 is in planar alignment with an outer wall surface (not shown) of the lateral member 42. Consequently, the grill assembly 10 has a linear appearance at the junction 11 of the upper and lateral assemblies 12, 40. Furthermore, when the union member 300 is positioned within the members 28, 42, the end 29 of the horizontal member 28 and the end 43 of the lateral member 42 are in an end-to-end configuration.

Although the upper assembly 12 and the lower assembly 14 are joined at the junction 11 with the union member 300, the assemblies 12, 14 are not fully secured to prevent longitudinal movement between the assemblies 12, 14. To fully secure the upper and lower assemblies 12, 14, a means for locking (not shown) can be utilized with the union member 300. Specifically, the locking means locks the union 300 within the frame members 26, 32 to secure the upper and lower assemblies 12, 14. Similarly, the locking means can be used to lock the union 300 within the frame members 28, 42 to secure the upper and lateral assemblies 12, 40. The locking means may include a radial projection and a mating detent, or may include an aperture for receiving a fastener. In the later configuration, the frame members 26, 32 have an aperture that is cooperatively positioned.

Alternatively, the first portion 310 of the union 300 can have a tapered configuration such that the perimeter of the first potion 310 is greater than the perimeter of the intermediate portion 314. Similarly, the second portion 312 can have a tapered configuration such that the perimeter of the first potion 310 is greater than the perimeter of the intermediate portion 314. The tapered configuration of the union 300 can facilitate the positioning of the union 300 within the members 26, 28, 32, 42 and can further facilitate the securement of the members 26, 28, 32, 42.

In a preferred embodiment, the union 300 is first positioned at the junction 11 in one of either the upper frame member 26 or the lower frame member 32. Next, the other of the upper frame member 26 or the lower frame member 32 is brought into engagement with the union 300. For example, the union 300 is positioned within the lower frame member 32. Then, the frame member 26 is brought into engagement with the union 300. As a result, the upper frame assembly 12 and the lower frame assembly 14 are joined at the junction 11. The upper frame assembly 14 and the lateral frame assembly 40 are joined in a similar manner.

In an another preferred embodiment, the union 300 is fixedly secured to one of either the upper frame member 26 or the lower frame member 32. In this configuration, the second portion 312 of the union 300 is secured to the inner surface 302 of the frame member 32 by weldment or other suitable means. The upper frame member 26 is then brought into engagement with the union 300. As a result, the upper frame assembly 12 and the lower frame assembly 14 are joined at the junction 11.

In yet another preferred embodiment, the union member 300 is biased into engagement with an inner surface of the members 26, 32. For example, the first portion 310 can be biased into engagement with the inner surface 306 of the frame member 26. Alternatively, the second portion 312 can be biased into engagement with the inner surface 308 of the frame member 32. The union member 300 may include means for biasing the union member 300 into engagement with an inner surface of the members 26, 32. Such means can include a fastener or a pin.

As shown in FIGS. 16 and 17, the union member 300 has a generally square-shaped cross-section. This configuration is necessary because the union member 300 is positioned within frame members 26, 28, 32, 42 that have a generally square-shaped cross-section. Accordingly, the configuration of the union member 300 varies with the configuration of the frame members 26, 28, 32, 42. When the frame members 26, 28, 32, 42 have a curvilinear configuration, the union members 300 have a similar curvilinear configuration. Preferably, the union member 300 is tubular, however, the union member 300 can have a solid configuration. In addition, the union member 300 can have a segmented configuration with at least one recess.

As discussed above, the union member 300 has a series of dimensions including a length L and a width W, generally defining a perimeter P. These dimensions can vary greatly with the design parameters of the union 300 and the assemblies 12, 14, 40. Because the union member 300 is positioned with the frame members 26, 28, 32, 42, and frictionally engages an inner surface of the frame members 26, 28, 32, 42, the union 300 is cooperatively dimensioned with the frame members 26, 28, 32, 42. Accordingly, as the dimensions, e.g, width and perimeter, of the frame members 26,28,32,42 are increased, the dimensions, e.g., width and perimeter, of the union member 300 are increased. This increase in the dimensions ensures that the outer surface 302 of the union member 300 frictionally engages an inner surface of the frame members 26, 28, 32, 42 to join the assemblies 12, 14, 40.

The union 300 can be formed from plastic, steel, aluminum, or other metals, including metal alloys. Forming the union 300 from metal is preferred because of its high strength.

The grill assembly 10 has a number of unique design features that benefit the packaging aspects of the assembly 10. Referring to FIG. 18, the lower vertical members 32, lower cross member 36 and lower horizontal members 100 are secured to define an inner space 102 of the lower assembly 14 that is suitable for receiving the upper assembly 12. The members 26, 28, 30 of the upper assembly 12 are secured to define an inner space 103 of the upper assembly 12 that is suitable for receiving a portion of the lower assembly 14.

As shown in FIG. 19, at least a portion of the upper assembly 12 can be placed within the inner space 102. When the upper assembly 12 is positioned within the inner space 102, at least one upper vertical member 26 of the upper assembly 12 is proximate a corresponding lower vertical member 32 of the lower assembly 14. Alternatively, at least a portion of the lower assembly 14 can be placed within the inner space 103. In the configuration shown in FIG. 19, the grill assembly 10 is in a "stacked position." In the stacked position, the assemblies 12, 14 are nested and the lateral assembly 40 can be positioned proximate the assemblies 12, 14 to form a relatively compact, yet rigid structural arrangement.

The grill assembly 10 can be packaged for distribution in the stacked position. In the stacked position, the grill assembly 10 has a generally small volume and a generally small footprint as compared to existing grill assemblies. These attributes significantly reduce the packaging costs of the grill assembly 10 because the assembly 10 can be packaged for distribution and shipping in a container with smaller dimensions than those currently used. The packaging costs are further reduced when the grill assembly 10 is packaged in the large overseas containers typically used for international distribution.

As shown in FIGS. 18 and 19, the upper assembly 12 and the lower assembly 14 are pre-assembled. Alternatively, the degree of pre-assembly for each of the upper assembly 12 and the lower assembly 14 can vary with the numerous packaging parameters of the grill assembly 10.

For example, the upper assembly 12 can be pre-assembled and the lower assembly 14 can be either partially or fully un-assembled. The lower assembly 14 would then require separate construction and securement to the upper assembly 12. As another example, the lower assembly 14 can be pre-assembled and the upper assembly 12 can be either partially or fully pre-assembled. The upper assembly 12 would then require separate construction and securement to the lower assembly 14.

Although the lateral assembly 40 is shown in FIGS. 18 and 19 as being assembled, the level or degree of pre-assembly of this component can vary with the packaging parameters.

Alternatively, packaging of the assembly 10 is benefitted by providing an upper frame assembly 12 with a preformed arrangement with a cooking device, such as an outdoor stove top, secured thereto. The lower frame assembly 14 may then be constructed separately by securement to the pre-assembled upper assembly 12.

In another preferred embodiment, the packaging of the grill assembly 10 includes at least one union member 300. The union member 300 can be packaged "loose" meaning that it is packaged as an individual component that is used during the construction of the assembly 10. Alternatively, the union member 300 is pre-positioned in one of either the upper assembly 12 or the lower assembly 14. Similarly, the union member 300 is pre-positioned in one of either the upper assembly 12 or the lateral assembly 40. Pre-positioning of the union member 300 reduces the number of steps required to construct the grill assembly 10.

Because the grill assembly 10 can be packaged in the stacked position, the number of separate components in the container can be significantly reduced. A reduction in the number of components is advantageous because there is a reduction in the time required to assemble the grill assembly 10. The number of components can vary depending upon the design parameters. However, the grill assembly 10 can be packaged in as few as three separate components—the upper assembly 12, the lower assembly 14, and the lateral assembly 40. In this manner, the individual components of each assembly 12, 14, 40 can be pre-assembled in the manufacturing facility. Consequently, each assembly 12, 14, 40 can be packaged as a complete unit. This means that each assembly 12, 14, 40 would have the specific components necessary to operate the grill assembly 10.

For example, the cooking chamber 16 and the temperature gage 21 can be pre-assembled in the upper assembly 12, the wheels 22 and the casters 24 can be pre-assembled in the lower assembly 14, and the controls 20 can be pre-assembled in the lateral assembly 40. A purchaser of the grill assembly 10 would remove the three assemblies 12, 14, 40 from the container and begin the assembly process, which due to the pre-assembled status of the assemblies 12, 14, 40 would require relatively few steps. First, the upper assembly 12 from the lower assembly 14 is lifted upward to remove it from the stacked position. After sufficiently elevating the upper assembly 12, it is aligned with the lower assembly 14. Next, the upper assembly 12 is brought into engagement with the lower assembly 14 such that the projection(s) 48 is received by the receiver(s) 50 in the upper assembly 12. The lateral assembly 40 is then brought into engagement with the upper assembly 12 such that the projection(s) 48 is received by the receiver(s) 50 in the upper assembly 12.

At this stage, the upper assembly 12 and the lower assembly 14 are joined but are not yet fully secured to prevent longitudinal movement between the assemblies 12, 14. To additionally secure the assemblies 12, 14, at least one biasing means 52 is inserted into the apertures 31, 70. When at least one projection 48 is biased or deformed into the biased position, the assemblies 12, 14 are thereby secured to prevent both longitudinal and transverse movement between the assemblies 12, 14.

Also at this stage, the upper assembly 12 and the lateral assembly 40 are joined but not fully secured to prevent longitudinal movement between the assemblies 12, 40. To additionally secure the assemblies 12, 40, at least one biasing means 52 is inserted into the apertures 31, 70 such that at least one projection 48 is biased or deformed into the biased position.

In contrast to existing grill designs, the upper assembly 12 does not require rotation, pivoting, or angular movement during the assembly process. Similarly, the lateral assembly 40 does not require rotation, pivoting, or angular movement during the assembly process of the grill assembly 10.

In another preferred embodiment, the grill assembly 10 includes at least one union member 300 used to join the upper assembly 12 and lower assembly 14, and the upper assembly 12 and the lateral assembly 40. The grill assembly 10 can be constructed in a number of ways using the union member 300. For example, a portion of the union member 300 is positioned within the vertical member 32 of the lower assembly 14. Specifically, the first portion 310 of the union member 300 extends past the end 90 of the frame member 32 and the second portion 312 is positioned within the frame member 32. Next, the upper frame member 26 is brought into engagement with the union member 300. Specifically, the first portion 310 of the union member 300 is positioned within the frame member 26. As a result, the upper frame assembly 12 and the lower frame assembly 14 are joined. Alternatively, the union member 300 can be first positioned within the upper frame member 26.

Alternatively, the locking means 350 can be utilized with the union member 300 after the upper assembly 12 and the lower assembly 14 are joined. The locking means 350 ensures that upper assembly 12 and the lower assembly 14 remain secured.

The grill assembly 10 has a number of unique design features that benefit the storage aspects of the assembly 10. The grill assembly 10 has an overall height that can be significantly reduced by separating or breaking down the upper and lower assemblies 12, 14. Referring to FIG. 18, the assemblies 12, 14 can be separated by removing the biasing means 52. Because the projection 48 and the receiver 50 are cooperatively dimensioned to permit removable insertion, the upper assembly 12 can be lifted from the lower assembly 10 once the biasing means 52 are removed. The upper assembly 12 can then be positioned within the inner space 102.

Similarly, the grill assembly 10 has an overall width that can be significantly reduced by breaking down the upper and lateral assemblies 12, 40. Once the biasing means 52 are removed, the assemblies 12, 40 can be separated and the lateral assembly can be positioned proximate the assemblies 12, 14. At this point, the grill assembly 10 is returned to the stacked position. In the stacked position, the grill assembly 10 can be easily stored since it has a generally small volume and a generally small footprint.

While specific embodiments have been illustrated and described, numerous modifications come to mind without significantly departing from the spirit of the invention and the scope of protection is only limited by the scope of the accompanying claims.

What is claimed is:

1. A barbecue grill assembly comprising:
   an upper frame assembly, the upper assembly having a cooking chamber;
   a lower frame assembly;
   at least one projection on an elongated frame member of one of either the lower assembly or the upper assembly, the projection being in linear alignment with the elongated frame member, the projection having a first portion and a second portion; and,
   at least one receiver on the other of said lower assembly or said upper assembly, the receiver having an inner surface, the projection and the receiver cooperatively dimensioned such that when the projection is received by the receiver, the first portion of the projection is biased against the inner surface of the receiver.

2. The barbecue grill assembly of claim 1, wherein the projection is positioned at a lower portion of the cooking chamber.

3. The barbecue grill assembly of claim 1, wherein the receiver is positioned at a lower portion of the cooking chamber.

4. The barbecue grill assembly of claim 1, wherein the projection depends from a lower portion of the cooking chamber.

5. The barbecue grill assembly of claim 1, wherein the receiver depends from a lower portion of the cooking chamber.

6. The barbecue grill assembly of claim 1, wherein the upper assembly has a plurality of upper frame members, the projection positioned on one of the upper frame members.

7. The barbecue grill assembly of claim 6, wherein the receiver is positioned on one of the lower frame members.

8. The barbecue grill assembly of claim 1, wherein the upper assembly has a plurality of upper frame members, the receiver positioned on one of the upper frame members.

9. The barbecue grill assembly of claim 8, wherein the projection is positioned on one of the lower frame members.

10. The barbecue grill assembly of claim 1, further comprising means for biasing the first portion into engagement with the inner surface.

11. The barbecue grill assembly of claim 10, wherein the biasing means is inserted through an aperture in the receiver to bias the first portion.

12. The barbecue grill assembly of claim 10, wherein the biasing means is inserted through an aperture in the receiver and an aperture in the projection to bias the first portion.

13. The barbecue grill assembly of claim 10, wherein the biasing means is a threaded fastener.

14. The barbecue grill assembly of claim 2, wherein at least a portion of the cooking chamber is formed of cast material.

15. The barbecue grill assembly of claim 14, wherein the projection is at least partially formed of the cast material.

16. The barbecue grill assembly of claim 3, wherein at least a portion of the cooking chamber is formed of cast material.

17. The barbecue grill assembly of claim 16, wherein the receiver is at least partially formed of the cast material.

18. A frame for an outdoor cooking device comprising:
    an upper assembly formed from a plurality of upper elongated frame members,
    a lower assembly formed from a plurality of lower elongated frame members;
    at least one projection on one of either the lower or the upper elongated frame member, the projection being in linear alignment with the elongated frame member, the projection having a first portion and a second portion; and,
    at least one receiver on the other of said lower assembly or said upper assembly, the receiver having an inner surface, the projection and the receiver cooperatively dimensioned such that the projection is received by the receiver, the first portion of the projection is biased against the inner surface of the receiver.

19. The frame of claim 18, wherein the projection is positioned on one of the upper frame members.

20. The frame of claim 18, wherein the receiver is positioned on one of the lower frame members.

21. The frame of claim 18, wherein the projection is positioned on one of the lower frame members.

22. The frame of claim 18, wherein the receiver is positioned on one of the upper frame members.

23. The frame of claim 18, wherein the upper assembly is pre-formed.

24. The frame of claim 18, wherein the lower assembly is pre-formed.

25. The frame of claim 18 further comprising means for biasing the first portion into engagement with the inner surface.

26. A frame assembly for an outdoor cooking device, the frame assembly comprising:
    a first frame assembly;
    a second frame assembly extending substantially lateral to the first frame assembly;
    at least one projection on an elongated frame member of one of either the first assembly or the second assembly, the projection being in linear alignment with the elongated frame member, the projection having a first portion and a second portion; and,
    at least one receiver on the other of said first frame assembly or said second frame assembly, the receiver having an inner surface, the projection and the receiver cooperatively dimensioned such that when the projection is received by the receiver, the first portion of the projection is biased against the inner surface of the receiver.

27. The frame assembly of claim 26, wherein the biasing of the first portion of the projection against the inner surface of the receiver provides cantilever support of the second frame assembly.

28. The frame assembly of claim 26, wherein the projection is on the first frame assembly.

29. The frame assembly of claim 26, wherein the receiver is on the second frame assembly.

30. The frame assembly of claim 26, wherein the projection is on the second frame assembly.

31. The frame assembly of claim 26, wherein the receiver is on the first frame assembly.

32. The frame assembly of claim 26, wherein the first frame assembly is formed from a plurality of frame members, the first frame assembly adapted to have an outdoor cooking device.

33. A barbecue grill assembly comprising:
- an upper frame assembly having at least one upper frame member, the upper frame member defining a receiver;
- a cooking chamber supported by the upper frame assembly;
- a lower frame assembly having at least one lower frame member;
- a projection dimensioned to be removably received by the receiver to join the upper and lower frame assemblies; and,
- wherein the projection is positioned within both the upper frame member and the lower frame member, and wherein a first portion of the projection is biased into contact with an inner surface of the receiver, and wherein a second portion of the projection is affixed to an inner surface of the lower frame member.

34. The barbecue grill assembly of claim 33 wherein the first portion of the projection is biased into contact with the inner surface of the lower frame member.

35. The barbecue grill assembly of claim 34 further comprising means for biasing the first portion of the receiver into contact with the inner surfaces of both the receiver and the lower frame member.

36. The barbecue grill assembly of claim 35 wherein the second portion of the projection has an aperture and the receiver has an aperture, wherein both apertures are cooperatively positioned and dimensioned to receive the biasing means.

37. The barbecue grill assembly of claim 36 wherein the first portion of the projection has a boss that receives the biasing force from the biasing means.

38. The barbecue grill assembly of claim 33 wherein the second portion of the projection is affixed to the inner surface of the lower frame member by weldment.

39. A barbecue grill assembly comprising:
- an upper frame assembly having at least one upper frame member, the upper frame member defining a receiver;
- a cooking chamber supported by the upper frame assembly;
- a lower frame assembly having at least one lower frame member;
- a projection removably received by the receiver to define a joined position of the upper and lower frame assemblies, the projection having a fixed portion and a free portion wherein the fixed portion is affixed to an inner surface of the lower frame member; and,
- means for biasing a free portion of the projection into contact with an inner surface of the receiver to define a secured position of the upper and lower frame assemblies.

40. The barbecue grill assembly of claim 39 wherein in the joined position a first clearance exists between the fixed portion of the receiver and the inner surface of the receiver.

41. The barbecue grill assembly of claim 40 wherein in the joined position a second clearance exists between the free portion of the receiver and the inner surface of the receiver.

42. The barbecue grill assembly of claim 41 wherein in the joined position a third clearance exists between the free portion of the receiver and the inner surface of the lower frame member.

43. The barbecue grill assembly of claim 39 wherein in the secured position the free portion of the projection is biased into contact with the inner surface of the lower frame member.

44. The barbecue grill assembly of claim 43 wherein the fixed portion of the projection has an aperture and the receiver has an aperture, wherein both apertures are cooperatively positioned to receive the biasing means.

45. The barbecue grill assembly of claim 39 wherein the free portion of projection has a boss that receives the biasing force from the biasing means.

46. The barbecue grill assembly of claim 39 wherein the upper frame member has an end and the lower frame member has an end, and wherein in the joined position the upper and lower frame assemblies are joined in an end-to-end configuration.

47. A barbecue grill assembly comprising:
- an upper assembly, the upper assembly having a cooking chamber;
- a lower assembly formed from a plurality of lower frame members;
- at least one projection on one of either the lower assembly or the upper assembly, the projection being in linear alignment with the elongated frame member, the projection having a first portion and a second portion;
- at least one receiver on the other of said lower assembly or said upper assembly, the receiver having an inner surface, the projection and the receiver cooperatively dimensioned such that when the projection is received by the receiver, the first portion of the projection is biased into contact with the inner surface of the receiver; and,
- means for biasing the first portion of the projection into engagement with the inner surface of the receiver, wherein the biasing means is inserted through an aperture in the receiver to bias the first portion.

48. A barbecue grill assembly comprising:
- an upper assembly, the upper assembly having a cooking chamber;
- a lower assembly formed from a plurality of lower frame member;
- at least one projection on one of either the lower assembly or the upper assembly, the projection being in linear alignment with the elongated frame member, the projection having a first portion and a second portion;
- at least one receiver on the other of said lower assembly or said upper assembly, the receiver having an inner surface, the projection and the receiver cooperatively dimensioned such that when the projection is received by the receiver, the first portion of the projection is biased into contact with the inner surface of the receiver; and,
- means for biasing the first portion of the projection into engagement with the inner surface of the receiver, wherein the biasing means is inserted through an aperture in the receiver and an aperture in the projection to bias the first portion.

49. A barbecue grill assembly comprising:
- an upper assembly, the upper assembly having a cooking chamber;
- a lower assembly formed from a plurality of lower frame members;
- at least one projection on one of either the lower assembly or the upper assembly, the projection being in linear alignment with the elongated frame member, the projection having a first portion and a second portion;

at least one receiver on the other of said lower assembly or said upper assembly, the receiver having an inner surface, the projection and the receiver cooperatively dimensioned such that when the projection is received by the receiver, the first portion of the projection is biased into contact with the inner surface of the receiver; and, a threaded fastener configured to bias the first portion of the projection into engagement with the inner surface of the receiver.

50. A barbecue grill assembly comprising:

a first assembly formed from a plurality of frame members;

a second assembly formed from a plurality of frame members;

a cooking chamber secured to either the first assembly or the second assembly;

at least one projection on a frame member of one of either the first assembly or the second assembly, the projection having a first portion and a second portion wherein the second portion is affixed to an inner surface of the frame member;

at least one receiver on a frame member of the other of either the first assembly or the second assembly; and, wherein the receiver is dimensioned to removably receive the projection to join the first and second frame assemblies, and wherein the first portion of the projection is biased into contact with an inner surface of the receiver.

51. The barbecue grill assembly of claim 50 wherein the first portion of the projection is biased into contact with the inner surface of the frame member to which the second portion is affixed.

52. The barbecue grill assembly of claim 50 further comprising means for biasing the first portion of the receiver into contact with the inner surface of the receiver.

53. The barbecue grill assembly of claim 52 wherein the second portion of the projection has an aperture and the receiver has an aperture, wherein both apertures are cooperatively positioned and dimensioned to receive the biasing means.

54. The barbecue grill assembly of claim 53 wherein the first portion of the projection has a boss that receives the biasing force from the biasing means.

55. The barbecue grill assembly of claim 50 wherein the second portion of the projection is affixed to the inner surface of the frame member by weldment.

56. A barbecue grill assembly comprising:

a first assembly formed from a plurality of frame members;

a second frame assembly formed from a plurality of frame members, the second frame assembly being positioned substantially lateral to die first frame assembly;

a cooking chamber secured to either the first assembly or the second assembly;

at least one projection on a frame member of one of either the first assembly or the second assembly, the projection having a first portion and a second portion wherein the second portion is affixed to an inner surface of the frame member;

at least one receiver on the other of either the first frame assembly or the second frame assembly; and, wherein the projection and the receiver are cooperatively dimensioned such that when the projection is received by the receiver, the first portion of the projection is biased into contact with an inner surface of the receiver.

57. The barbecue grill assembly of claim 56 wherein the first portion of the projection is biased into contact with the inner surface of the frame member to which the second portion is affixed.

58. The barbecue grill assembly of claim 56 further comprising means for biasing the first portion of the receiver into contact with the inner surface of the receiver.

59. The barbecue grill assembly of claim 58 wherein the second portion of the projection has an aperture and the receiver has an aperture, wherein both apertures are cooperatively positioned and dimensioned to receive the biasing means.

60. The barbecue grill assembly of claim 59 wherein the first portion of the projection has a boss that receives the biasing force from the biasing means.

61. The barbecue grill assembly of claim 56 wherein the second portion of the projection is affixed to the inner surface of the frame member by weldment.

\* \* \* \* \*